(12) United States Patent
Bushey et al.

(10) Patent No.: US 8,005,204 B2
(45) Date of Patent: Aug. 23, 2011

(54) CALL ROUTING SYSTEM AND METHOD OF USING THE SAME

(75) Inventors: Robert R. Bushey, Cedar Park, TX (US); Sarah Korth, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1333 days.

(21) Appl. No.: 11/145,513

(22) Filed: Jun. 3, 2005

(65) Prior Publication Data

US 2007/0019800 A1 Jan. 25, 2007

(51) Int. Cl.
*H04M 3/42* (2006.01)
*H04M 3/00* (2006.01)
*H04M 5/00* (2006.01)

(52) U.S. Cl. ......... 379/211.01; 379/211.02; 379/212.01; 379/265.01; 379/266.01

(58) Field of Classification Search ............. 379/211.01, 379/265.01, 114.2, 266.01, 88.18, 211.02, 379/201.01, 242, 212.01; 713/200; 705/18
See application file for complete search history.

(56) References Cited

U.S. PATENT DOCUMENTS

| | | | |
|---|---|---|---|
| 4,935,927 A | 6/1990 | Kaewell, Jr. et al. | |
| 4,953,204 A | 8/1990 | Cuschelg, Jr. et al. | |
| 4,967,405 A | 10/1990 | Upp et al. | |
| 4,989,230 A | 1/1991 | Gillig et al. | |
| 5,127,042 A | 6/1992 | Gillig et al. | |
| 5,142,695 A | 8/1992 | Roberts et al. | |
| 5,155,759 A | 10/1992 | Saegusa et al. | |
| 5,218,716 A | 6/1993 | Comroe et al. | |
| 5,229,701 A | 7/1993 | Leman et al. | |
| 5,247,567 A | 9/1993 | Hirano et al. | |
| 5,260,988 A | 11/1993 | Schellinger et al. | |
| 5,335,269 A | 8/1994 | Steinlicht | |
| 5,353,331 A | 10/1994 | Emery et al. | |
| 5,367,558 A | 11/1994 | Gillig et al. | |
| 5,373,161 A | 12/1994 | Fuller et al. | |
| 5,442,680 A | 8/1995 | Schellinger et al. | |
| 5,455,903 A | 10/1995 | Jolissaint et al. | |

(Continued)

FOREIGN PATENT DOCUMENTS

EP 0 424 015 A2 4/1991

(Continued)

OTHER PUBLICATIONS

U.S. Appl. No. 10/898,722, filed Jul. 23, 2004.

(Continued)

*Primary Examiner* — Thjuan K Addy
(74) *Attorney, Agent, or Firm* — Toler Law Group (57) ABSTRACT

A call service center can include a call routing system that can use one or more action object identifiers. In one embodiment, a future action object identifier is associated with a task that is desired or otherwise intended to be performed at the call service center. The call routing system may route the call to a module that is not associated with the future action object identifier or perform a portion of a task within the same module, wherein the portion of the task is not associated with the future action object identifier. In another embodiment, at least two action object identifiers can be passed with a call from one module to another module. In a particular embodiment, a past, current, or future action object identifier, other information related to the call, or any combination thereof may be passed from one module to another module with the call.

31 Claims, 4 Drawing Sheets

U.S. PATENT DOCUMENTS

| | | |
|---|---|---|
| 5,469,496 A | 11/1995 | Emery et al. |
| 5,497,373 A | 3/1996 | Hulen et al. |
| 5,515,366 A | 5/1996 | Chieu et al. |
| 5,522,046 A | 5/1996 | McMillen et al. |
| 5,530,744 A | 6/1996 | Charalambous et al. |
| 5,550,895 A | 8/1996 | Burson et al. |
| 5,553,117 A | 9/1996 | Peterson et al. |
| 5,555,299 A | 9/1996 | Maloney et al. |
| 5,590,186 A | 12/1996 | Liao et al. |
| 5,636,243 A | 6/1997 | Tanaka |
| 5,644,620 A | 7/1997 | Shimura |
| 5,652,789 A | 7/1997 | Miner et al. |
| 5,673,308 A | 9/1997 | Akhavan |
| 5,745,850 A | 4/1998 | Aldermeshian et al. |
| 5,748,147 A | 5/1998 | Bickley et al. |
| 5,754,639 A | 5/1998 | Flockhart et al. |
| 5,754,978 A | 5/1998 | Perez-Mendez et al. |
| 5,842,112 A | 11/1998 | Fuller et al. |
| 5,923,745 A | 7/1999 | Hurd |
| 5,940,476 A | 8/1999 | Morganstein et al. |
| 5,946,388 A | 8/1999 | Walker et al. |
| 5,950,133 A | 9/1999 | Bledsoe |
| 5,953,704 A | 9/1999 | McIlroy et al. |
| 5,995,839 A | 11/1999 | Coursey et al. |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,041,229 A | 3/2000 | Turner |
| 6,049,594 A | 4/2000 | Furman et al. |
| 6,069,588 A | 5/2000 | O'Neill, Jr. |
| 6,073,031 A | 6/2000 | Helstab et al. |
| 6,091,949 A | 7/2000 | Sanchez |
| 6,118,866 A | 9/2000 | Shtivelmann |
| 6,119,101 A | 9/2000 | Peckover |
| 6,130,938 A | 10/2000 | Erb |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,185,427 B1 | 2/2001 | Krasner et al. |
| 6,188,888 B1 | 2/2001 | Bartle et al. |
| 6,201,950 B1 | 3/2001 | Fuller et al. |
| 6,208,854 B1 | 3/2001 | Roberts et al. |
| 6,240,297 B1 | 5/2001 | Jadoul |
| 6,259,786 B1 | 7/2001 | Gisby |
| 6,269,153 B1 | 7/2001 | Carpenter et al. |
| 6,301,350 B1 | 10/2001 | Henningson et al. |
| 6,317,439 B1 | 11/2001 | Cardona et al. |
| 6,320,534 B1 | 11/2001 | Goss |
| 6,327,363 B1 * | 12/2001 | Henderson et al. ...... 379/265.01 |
| 6,332,082 B1 | 12/2001 | Fuller et al. |
| 6,333,980 B1 | 12/2001 | Hollatz et al. |
| 6,353,608 B1 | 3/2002 | Cullers et al. |
| 6,362,778 B2 | 3/2002 | Neher |
| 6,366,658 B1 | 4/2002 | Bjornberg et al. |
| 6,366,668 B1 | 4/2002 | Borst et al. |
| 6,373,817 B1 | 4/2002 | Kung et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,414,966 B1 | 7/2002 | Kulkarni et al. |
| 6,418,424 B1 | 7/2002 | Hoffberg et al. |
| 6,424,840 B1 | 7/2002 | Fitch et al. |
| 6,442,247 B1 | 8/2002 | Garcia |
| 6,480,593 B1 | 11/2002 | Munday et al. |
| 6,484,027 B1 | 11/2002 | Mauney et al. |
| 6,505,055 B1 | 1/2003 | Kahn et al. |
| 6,510,414 B1 | 1/2003 | Chaves |
| 6,516,060 B1 | 2/2003 | Foladare et al. |
| 6,519,562 B1 | 2/2003 | Phillips et al. |
| 6,529,871 B1 | 3/2003 | Kanevsky et al. |
| 6,553,112 B2 | 4/2003 | Dhir et al. |
| 6,570,967 B2 | 5/2003 | Katz |
| 6,574,213 B1 | 6/2003 | Anandakumar et al. |
| 6,574,470 B1 | 6/2003 | Chow et al. |
| 6,584,180 B2 | 6/2003 | Nemoto |
| 6,587,475 B1 | 7/2003 | Przygienda |
| 6,587,556 B1 | 7/2003 | Judkins et al. |
| 6,587,683 B1 | 7/2003 | Chow et al. |
| 6,598,136 B1 | 7/2003 | Norrod et al. |
| 6,600,734 B1 | 7/2003 | Gernert et al. |
| 6,600,736 B1 | 7/2003 | Ball et al. |
| 6,603,854 B1 | 8/2003 | Judkins et al. |
| 6,611,681 B2 | 8/2003 | Henderson et al. |
| 6,614,206 B1 | 9/2003 | Wong et al. |
| 6,614,781 B1 | 9/2003 | Elliott et al. |
| 6,614,784 B1 | 9/2003 | Glitho et al. |
| 6,625,423 B1 | 9/2003 | Wang |
| 6,631,186 B1 | 10/2003 | Adams et al. |
| 6,650,088 B1 | 11/2003 | Webb et al. |
| 6,678,360 B1 | 1/2004 | Katz |
| 6,678,718 B1 | 1/2004 | Khouri et al. |
| 6,690,788 B1 | 2/2004 | Bauer et al. |
| 6,694,012 B1 | 2/2004 | Posthuma |
| 6,697,460 B2 | 2/2004 | Knott et al. |
| 6,700,972 B1 | 3/2004 | McHugh et al. |
| 6,704,404 B1 | 3/2004 | Burnett |
| 6,704,580 B1 | 3/2004 | Fintel |
| 6,707,789 B1 | 3/2004 | Arslan et al. |
| 6,714,631 B1 | 3/2004 | Martin et al. |
| 6,721,416 B1 | 4/2004 | Farrell |
| 6,721,882 B1 | 4/2004 | Sabinson |
| 6,731,722 B2 | 5/2004 | Coffey |
| 6,735,432 B1 | 5/2004 | Jarett et al. |
| 6,738,473 B1 | 5/2004 | Burg et al. |
| 6,744,861 B1 | 6/2004 | Pershan et al. |
| 6,744,877 B1 | 6/2004 | Edwards |
| 6,751,306 B2 | 6/2004 | Himmel et al. |
| 6,757,306 B1 | 6/2004 | Klish, II et al. |
| 6,766,175 B2 | 7/2004 | Uchiyama |
| 6,766,320 B1 | 7/2004 | Wang et al. |
| 6,775,359 B1 | 8/2004 | Ron et al. |
| 6,778,643 B1 | 8/2004 | Bushey et al. |
| 6,792,096 B2 | 9/2004 | Martin et al. |
| 6,807,274 B2 | 10/2004 | Joseph et al. |
| 6,823,307 B1 | 11/2004 | Steinbiss et al. |
| 6,831,932 B1 | 12/2004 | Boyle et al. |
| 6,832,224 B2 | 12/2004 | Gilmour |
| 6,842,504 B2 | 1/2005 | Mills et al. |
| 6,847,711 B2 | 1/2005 | Knott et al. |
| 6,853,722 B2 | 2/2005 | Joseph et al. |
| 6,853,966 B2 | 2/2005 | Bushey et al. |
| 6,856,806 B1 | 2/2005 | Bosik et al. |
| 6,859,529 B2 | 2/2005 | Duncan et al. |
| 6,871,212 B2 | 3/2005 | Khouri et al. |
| 6,879,683 B1 | 4/2005 | Fain et al. |
| 6,885,734 B1 | 4/2005 | Eberle et al. |
| 6,891,932 B2 | 5/2005 | Bhargava et al. |
| 6,892,083 B2 | 5/2005 | Shostak |
| 6,895,083 B1 | 5/2005 | Bers et al. |
| 6,901,366 B1 | 5/2005 | Kuhn et al. |
| 6,907,119 B2 | 6/2005 | Case et al. |
| 6,915,246 B2 | 7/2005 | Gusler et al. |
| 6,963,983 B2 | 11/2005 | Munson et al. |
| 6,978,154 B1 | 12/2005 | Ospalak et al. |
| 6,978,163 B2 | 12/2005 | Dyer et al. |
| 7,006,605 B1 | 2/2006 | Morganstein et al. |
| 7,031,444 B2 | 4/2006 | Shen et al. |
| 7,035,388 B2 | 4/2006 | Kurosaki et al. |
| 7,062,029 B2 | 6/2006 | Lund |
| 7,103,165 B2 | 9/2006 | Baniak |
| 7,110,512 B2 * | 9/2006 | Maropis et al. ............ 379/114.2 |
| 2001/0011211 A1 | 8/2001 | Bushey et al. |
| 2001/0014599 A1 | 8/2001 | Henderson |
| 2001/0018672 A1 | 8/2001 | Petters et al. |
| 2001/0019955 A1 | 9/2001 | Henderson |
| 2001/0021948 A1 | 9/2001 | Khouri et al. |
| 2001/0032229 A1 | 10/2001 | Hulls et al. |
| 2001/0034662 A1 | 10/2001 | Morris |
| 2002/0046030 A1 | 4/2002 | Haritsa et al. |
| 2002/0049874 A1 | 4/2002 | Kimura et al. |
| 2002/0057678 A1 | 5/2002 | Jiang et al. |
| 2002/0059164 A1 | 5/2002 | Shtivelman |

| | | |
|---|---|---|
| 2002/0059169 A1 | 5/2002 | Quarterman et al. |
| 2002/0067714 A1 | 6/2002 | Crain et al. |
| 2002/0087385 A1 | 7/2002 | Vincent |
| 2002/0111190 A1 | 8/2002 | Harrison et al. |
| 2002/0114432 A1 | 8/2002 | Shaffer et al. |
| 2002/0115480 A1 | 8/2002 | Huang |
| 2002/0116336 A1 | 8/2002 | Diacakis et al. |
| 2002/0119800 A1 | 8/2002 | Jaggers et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0137472 A1 | 9/2002 | Quinn et al. |
| 2002/0156699 A1 | 10/2002 | Gray et al. |
| 2002/0165732 A1 | 11/2002 | Ezzeddine et al. |
| 2002/0181442 A1 | 12/2002 | Rajani |
| 2002/0196277 A1 | 12/2002 | Bushey et al. |
| 2003/0003900 A1 | 1/2003 | Goss et al. |
| 2003/0018659 A1 | 1/2003 | Fuks et al. |
| 2003/0026409 A1 | 2/2003 | Bushey et al. |
| 2003/0035381 A1 | 2/2003 | Chen et al. |
| 2003/0035516 A1 | 2/2003 | Guedalia |
| 2003/0039242 A1 | 2/2003 | Moore, Jr. |
| 2003/0048195 A1 | 3/2003 | Trossen |
| 2003/0069937 A1 | 4/2003 | Khouri et al. |
| 2003/0092451 A1 | 5/2003 | Holloway et al. |
| 2003/0095651 A1 | 5/2003 | Book et al. |
| 2003/0097428 A1 | 5/2003 | Afkhami et al. |
| 2003/0103619 A1 | 6/2003 | Brown et al. |
| 2003/0108183 A1* | 6/2003 | Dhir et al. ............... 379/265.01 |
| 2003/0114105 A1 | 6/2003 | Haller et al. |
| 2003/0125075 A1 | 7/2003 | Klovborg |
| 2003/0130864 A1 | 7/2003 | Ho et al. |
| 2003/0133421 A1 | 7/2003 | Sundar et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0156133 A1 | 8/2003 | Martin et al. |
| 2003/0165223 A1 | 9/2003 | Timmins et al. |
| 2003/0181202 A1 | 9/2003 | Link, III et al. |
| 2003/0187732 A1 | 10/2003 | Seta |
| 2003/0187773 A1 | 10/2003 | Santos et al. |
| 2003/0194063 A1 | 10/2003 | Martin et al. |
| 2003/0195753 A1 | 10/2003 | Homuth et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0235282 A1 | 12/2003 | Sichelman et al. |
| 2003/0235287 A1 | 12/2003 | Margolis et al. |
| 2004/0005047 A1 | 1/2004 | Joseph et al. |
| 2004/0006473 A1 | 1/2004 | Mills et al. |
| 2004/0018774 A1 | 1/2004 | Long et al. |
| 2004/0032484 A1 | 2/2004 | Halttunen |
| 2004/0032862 A1 | 2/2004 | Schoeneberger et al. |
| 2004/0032935 A1 | 2/2004 | Mills et al. |
| 2004/0042592 A1 | 3/2004 | Knott et al. |
| 2004/0044950 A1 | 3/2004 | Mills et al. |
| 2004/0047453 A1* | 3/2004 | Fraser ............... 379/88.18 |
| 2004/0066401 A1 | 4/2004 | Bushey et al. |
| 2004/0066416 A1 | 4/2004 | Knott et al. |
| 2004/0066776 A1 | 4/2004 | Ishidoshiro |
| 2004/0072544 A1 | 4/2004 | Alexis |
| 2004/0073569 A1 | 4/2004 | Knott et al. |
| 2004/0083479 A1 | 4/2004 | Bondarenko et al. |
| 2004/0088285 A1 | 5/2004 | Martin et al. |
| 2004/0103017 A1 | 5/2004 | Reed et al. |
| 2004/0109555 A1 | 6/2004 | Williams |
| 2004/0116073 A1 | 6/2004 | Mauney et al. |
| 2004/0120473 A1 | 6/2004 | Birch et al. |
| 2004/0120492 A1 | 6/2004 | Lew et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0127241 A1 | 7/2004 | Shostak |
| 2004/0156491 A1 | 8/2004 | Reding et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0174980 A1 | 9/2004 | Knott et al. |
| 2004/0203374 A1 | 10/2004 | Zilliacus |
| 2004/0204056 A1 | 10/2004 | Phelps, III |
| 2004/0213212 A1 | 10/2004 | Reding et al. |
| 2004/0230438 A1 | 11/2004 | Pasquale et al. |
| 2004/0240635 A1 | 12/2004 | Bushey et al. |
| 2004/0243568 A1 | 12/2004 | Wang et al. |
| 2004/0266425 A1 | 12/2004 | Gonsalves et al. |
| 2005/0008141 A1 | 1/2005 | Kortum et al. |
| 2005/0015197 A1 | 1/2005 | Ohtsuji et al. |
| 2005/0015744 A1 | 1/2005 | Bushey et al. |
| 2005/0018825 A1 | 1/2005 | Ho et al. |
| 2005/0020236 A1 | 1/2005 | Mauney et al. |
| 2005/0027535 A1 | 2/2005 | Martin et al. |
| 2005/0032475 A1 | 2/2005 | Mauney et al. |
| 2005/0041796 A1 | 2/2005 | Joseph et al. |
| 2005/0047578 A1 | 3/2005 | Knott et al. |
| 2005/0054335 A1 | 3/2005 | Pearson et al. |
| 2005/0055216 A1 | 3/2005 | Bushey et al. |
| 2005/0058264 A1 | 3/2005 | Joseph et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0075894 A1 | 4/2005 | Bushey et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0096024 A1 | 5/2005 | Bicker et al. |
| 2005/0113077 A1 | 5/2005 | Bushnell et al. |
| 2005/0131892 A1 | 6/2005 | Knott et al. |
| 2005/0132262 A1 | 6/2005 | Bushey et al. |
| 2005/0135595 A1 | 6/2005 | Bushey et al. |
| 2005/0141479 A1 | 6/2005 | Ozugur et al. |
| 2005/0141692 A1 | 6/2005 | Scherer et al. |
| 2005/0147218 A1 | 7/2005 | Novack et al. |
| 2005/0169441 A1 | 8/2005 | Yacoub et al. |
| 2005/0169453 A1 | 8/2005 | Knott et al. |
| 2005/0172148 A1* | 8/2005 | Ying ............... 713/200 |
| 2005/0201547 A1 | 9/2005 | Burg et al. |
| 2005/0210101 A1 | 9/2005 | Janik |
| 2005/0240411 A1 | 10/2005 | Yacoub et al. |
| 2005/0273781 A1 | 12/2005 | Nakamura et al. |
| 2005/0277431 A1 | 12/2005 | White |
| 2005/0282582 A1 | 12/2005 | Slotznick |
| 2006/0003806 A1 | 1/2006 | Weber et al. |
| 2006/0031587 A1 | 2/2006 | Paterson et al. |
| 2006/0050865 A1 | 3/2006 | Kortum et al. |
| 2006/0056406 A1 | 3/2006 | Bouchard et al. |
| 2006/0072737 A1 | 4/2006 | Paden et al. |
| 2006/0165066 A1 | 7/2006 | Campbell et al. |
| 2006/0177040 A1 | 8/2006 | Mitra et al. |
| 2006/0182252 A1 | 8/2006 | Harris et al. |
| 2006/0195312 A1 | 8/2006 | Knight et al. |
| 2006/0215833 A1 | 9/2006 | Mahoney |
| 2006/0291642 A1 | 12/2006 | Bushey et al. |
| 2007/0019800 A1 | 1/2007 | Bushey et al. |
| 2007/0041551 A1 | 2/2007 | Whitecotton et al. |
| 2007/0047720 A1 | 3/2007 | Brandt et al. |
| 2007/0116230 A1 | 5/2007 | Brandt et al. |
| 2008/0273687 A1* | 11/2008 | Knott et al. ............... 379/266.01 |
| 2009/0171799 A1* | 7/2009 | Ying ............... 705/18 |

FOREIGN PATENT DOCUMENTS

| | | |
|---|---|---|
| EP | 0 424 015 A3 | 4/1991 |
| EP | 0 424 015 B1 | 4/1991 |
| EP | 671859 | 9/1995 |
| EP | 713345 | 5/1996 |
| EP | 0 876 652 A4 | 9/1996 |
| GB | 2305078 | 3/1997 |
| JP | 8-163646 | 6/1996 |
| JP | 8-172673 | 7/1996 |
| JP | 8-294168 | 11/1996 |
| JP | 8-294170 | 11/1996 |
| JP | 8-317468 | 11/1996 |
| JP | 8-322087 | 12/1996 |
| JP | 9-37345 | 2/1997 |
| JP | 9-55981 | 2/1997 |
| JP | 9-84117 | 3/1997 |
| JP | 9-98475 | 4/1997 |

| WO | 94/05101 | 3/1994 |
|---|---|---|
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 10/975,023, filed Oct. 27, 2004.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
www.yahoo.com (as in Dec. 12, 1998) as archived in the Internet archive (www.archive.org).
Ogino, Tsukasa, et al. "Technologies for Internet Infrastructure: Eliminating the World Wide Wait," iNet Japan, Jul. 18-21, 2000, www.isoc.org/inet2000/cdproceedings/1g/index.
International Search Report for International Application No. PCT/US06/28349, mailed on Aug. 13, 2007.
Written Opinion of the International Searching Authority for PCT/US06/28349, mailed on Aug. 13, 2007.
Bluetooth Consortium, "Specification of the Bluetooth System: Profiles"; Dec. 1, 1999.
Haartsen, J., "Bluetooth: A New Radio Interface Providing Ubiquitous Connectivity", IEEE, Dec. 2000, pp. 107-111.
Schneiderman, R., "Bluetooth's Slow Down", IEEE, Dec. 1999, pp. 61-65.
Charney, Ben; "VoIP Maker Plans Cell Hybrid"; http://zdnet.com, News Software; Oct. 3, 2003. pp. 1-3.
International Search Report and Written Opinion of the International Searching Authority for PCT/US04/34239; Feb. 17, 2005; 10 pages.
International Search Report and Written Opinion of the International Searching Authority for PCT/US05/16449; Apr. 10, 2006; 11 pages.
International Search Report and Written Opinion of the International Searching Authority for PCT/US04/16017; Aug. 16, 2005; 7 pages.
International Search Report and Written Opinion of the International Searching Authority for PCT/US04/28260; Sep. 30, 2005; 10 pages.
International Search Report and Written Opinion of the International Searching Authority for PCT/US2005/016449; Jun. 15, 2006; 3 pages.

* cited by examiner

FIG. 4

CALL ROUTING SYSTEM AND METHOD OF USING THE SAME

BACKGROUND

1. Field of the Disclosure

The present disclosure relates to call routing systems, and more particularly to methods, data processing systems, and data processing system readable media for use in call routing systems.

2. Description of the Related Art

Many businesses use call service centers as a way to conduct business with their customers. Operating a call services center can be expensive, particularly if an attendant needs to interact with every or nearly every caller. Automating call service centers typically includes using a call routing system. Insufficient information may be provided to a call routing system. If insufficient information is provided, the call may be routed to an improper destination, or the call may need to be manually dispositioned by an attendant. The former can be problematic because it can increase the caller's frustration with the call service center and may result in potential lost revenue. The latter can be problematic because the purpose of automating is to reduce having calls, that could otherwise be properly routed, manually dispositioned by an attendant.

Skilled artisans will appreciate that elements in the figures are illustrated for simplicity and clarity and have not necessarily been drawn to scale.

DETAILED DESCRIPTION

A call service center can include a call routing system that can use one or more action object identifiers. In one embodiment, an action object identifier can be associated with a task that is desired or otherwise intended to be performed at the call service center. The call routing system may route the call to a module that is not associated with the action object identifier or perform a portion of a task within the same module, wherein the portion of the task is not associated with the action object identifier. The use of the one or more action object identifiers can help a data processing system or a human attendant in more accurately handling the routing of the call. In another embodiment, at least two action object identifiers can be passed with a call from one module to another module. In a particular embodiment, a past action object identifier, a current action object identifier, a future action object identifier, other information related to the call, or any combination thereof may be passed from one module to another module along with the call. By using more than one action object identifier, more complex logic can be used by a data processing system or a human attendant can review the action object identifiers to more accurately route the call, as more variables are available to determine how to route of the call. A log file or other data from a database, storage network, or other memory does not need to be accessed, and thus, the call can be routed quicker and more accurately.

In a first aspect, a method of using a call routing system can include generating an action object identifier at a first module in response at least in part to a call, and routing the call to a second module that does not correspond to the action object identifier. The method can also include routing the call to a third module that is associated with the action object identifier after routing the call to the second module.

In a second aspect, a data processing system can include a first module configured to generate an action object identifier and pass or have passed a call to a second module that does not correspond to the action object identifier. The data processing system can also include a second module configured to perform a first task regarding the call, wherein the first task does not correspond to the action object identifier, and pass or have passed the call to a third module that is associated with the action object identifier. The data processing system can further include a third module configured to perform a second task regarding the call, wherein the second task is associated with the action object identifier.

In a third aspect, a data processing system readable medium can have data to be used with a call routing system, wherein the data is embodied within the data processing system readable medium. The data can include an instruction to generate an action object identifier at a first module in response at least in part to a call, an instruction to route the call to a second module that does not correspond to the action object identifier, and an instruction to route the call to a third module that is associated with the action object identifier after routing the call to the second module.

In a fourth aspect, a data processing system readable medium can have data to be used with a call routing system, wherein the data is embodied within the data processing system readable medium. The data can include an instruction to pass a call, a first action object identifier, and a second action object identifier from a first module to a second module, wherein the first and second modules are within the call routing system.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of "a" or "an" are employed to describe one or more articles to which "a" or "an" refers. Therefore, the description should be read to include at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more components outside the system, one or more modules outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more components, one or more devices, or one or more modules.

Unless otherwise defined, technical and scientific terms used herein have the same meaning as commonly understood by one of ordinary skill in the art. In addition, the methods and examples disclosed are illustrative only and not intended to be limiting.

Figure 1:
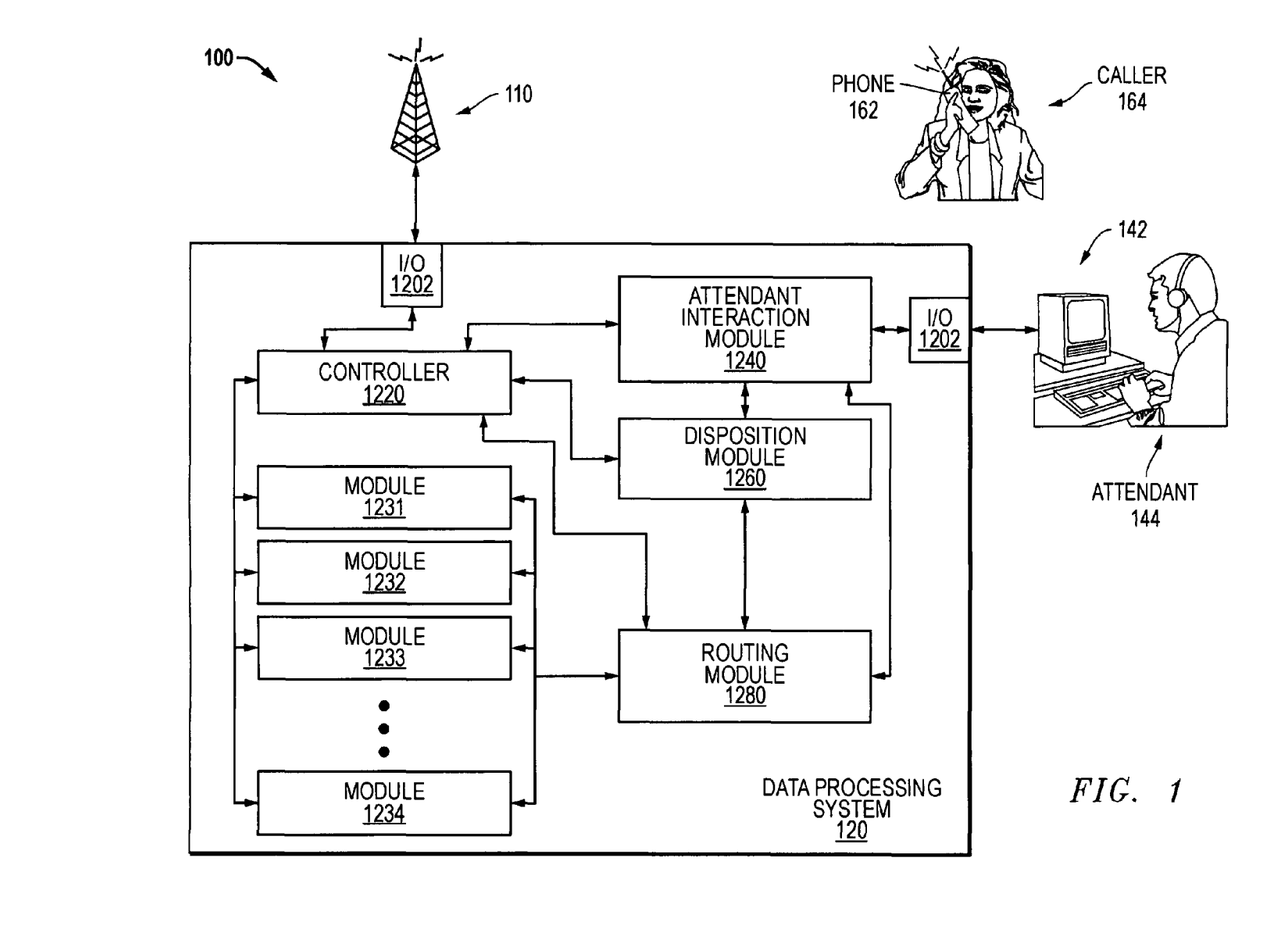
FIG. 1 includes a general diagram of a caller at a phone using a call service center including a call routing system.

FIG. 1 includes a general diagram of a caller 164 using a call service center 100. The call service center 100 can receive a call from a caller 164 that allows the caller to obtain information, products, or services, potentially without using an attendant. Thus, the call service center 100 can be used by a wide variety of businesses including manufactures, retailers, distributors, telephone service providers, airlines, etc. The call service center 100 can be designed as described herein to help automate routing of calls within the call service center 100 while still allowing an attendant or other human to interact with the caller to reduce caller frustration, reduce the likelihood that the caller, who may intend on purchasing a product or service, leaves without successfully making the purchase, etc. After reading this specification, skilled artisans will appreciate that the architectures and methods described herein can be adapted to the need or desires of the entity using a call service center.

The call service center 100 can include a data processing system 120 that is bi-directionally coupled to an antenna 110 and an attendant terminal 142. In another embodiment, the antenna 110 is not used, particularly if the phone 162 is a wireline phone, rather than a wireless phone as illustrated in FIG. 1. A human attendant 144 can be present at the attendant terminal 142. A caller 164 can use a phone 162 to call the call service center 100 and transact business with the entity operating the call service center 100. The call may include speech of the caller 164 that may be received by the call service center 100. The caller 164 may or may not speak at all during the call. In one embodiment, the phone 162 is communicatively coupled to the data processing system 120, via the antenna 110. The phone 162 can include a wireline phone or a wireless phone. The phone 162 can include a conventional telephone, a cell phone, a voice over Internet protocol phone, or the like. Wires, switches, routers, or potentially other equipment (not illustrated) may be used to communicatively couple the phone 162 to the data processing system 120.

The data processing system 120 can be part of or include a call routing system, as described herein. Each of the antenna 110 and attendant terminal 142 can be coupled to the data processing system 120 through one or more input/output ("I/O") ports 1202. In another embodiment, separate input ports and output ports could be used. For simplicity, I/O ports 1202 will be used to refer to any or all of input ports, output ports or input/output ports. The data processing system 120 further comprises a controller 1220 that is bi-directionally coupled to modules that are designed to perform actions as requested by a caller using the call service center 100. In the embodiment as illustrated in FIG. 1, the controller 1220 is bi-directionally coupled to module 1231, module 1232, module 1233, and module 1234. Although not illustrated, one or more other modules may be present. Each of the modules 1231 through 1234 can perform one or more actions at the call service center 100. Such actions can include authenticating caller 164, determining account status or other account information of the caller 164, providing information regarding products or services of the entity operation the call service center 100, allowing the caller 164 to purchase products or services at the call service center 100, perform other suitable action, or any combination thereof. Each of the modules 1231 through 1234 may or may not be configured to route the call to the other of the modules 1231 through 1234. In another embodiment, more or fewer modules may be used.

The controller 1220 is also bi-directionally coupled to an attendant interaction module 1240, a disposition module 1260, and a routing module 1280. The attendant interaction module 1240 can allow an attendant input signal from the attendant terminal 142 to be received at the data processing system 120 when the attendant 144 is servicing a call. The attendant interaction module 1240 is bi-directionally coupled to the disposition module 1260 and the routing module 1280. The disposition module 1260 can receive an attendant interaction signal from the attendant interaction module 1240 or a signal from the controller 1220 in order to generate a disposition signal at the disposition module 1260 in order to disposition a call. The disposition module is bi-directionally coupled to the routing module 1280. The routing module 1280 may receive signals from the controller 1220, the attendant interaction module 1240, the disposition module 1260, any one or more of the modules 1231 through 1234, or any combination thereof in order to route the call to an appropriate module when servicing the call.

Although not illustrated, other connections and memories may reside in or be coupled to the data processing system 120. Such memories can include a hard disk, content addressable memory, static random access memory, cache, first-in-first-out ("FIFO"), a database, a storage network, other memories, or any combination thereof. The memories can include media that can be read by the data processing system 120. Therefore, each of the types of memory includes a data processing system readable medium.

Portions of the methods described herein may be implemented in suitable software code or other data for carrying out the methods described. In one embodiment, computer-executable instructions may be lines of assembly code or compiled C++, Java, or other language code. In another embodiment, the code may be contained on a data storage device, such as a hard disk, magnetic tape, floppy diskette, optical storage device, networked storage device(s), or other appropriate data processing system readable medium or storage device.

Functions preformed by any one or more of the modules may be combined with one or more other modules or the controller 1220. For example, the disposition module 1260 and the routing module 1280 may be combined into a single module. In still another embodiment, one or more of the modules may be located outside of the data processing system 120. For example, the attendant interaction module 1240 could reside in the attendant terminal 142. Further, more than one type of module may reside in one or more devices. For example, a disposition module may reside within the phone 162, the attendant terminal 142, or both in addition to or in place of the disposition module 1280 within the data processing system 120. Such disposition modules may be substantially the same or different when compared to each other. Also, any single module may be embedded within a plurality of integrated circuits, chip sets, circuit boards, or the like. Additionally, a software program or its software components with such code may be embodied in more than one data processing system readable medium in more than one computer or other item having a controller or a processor.

Figure 2:
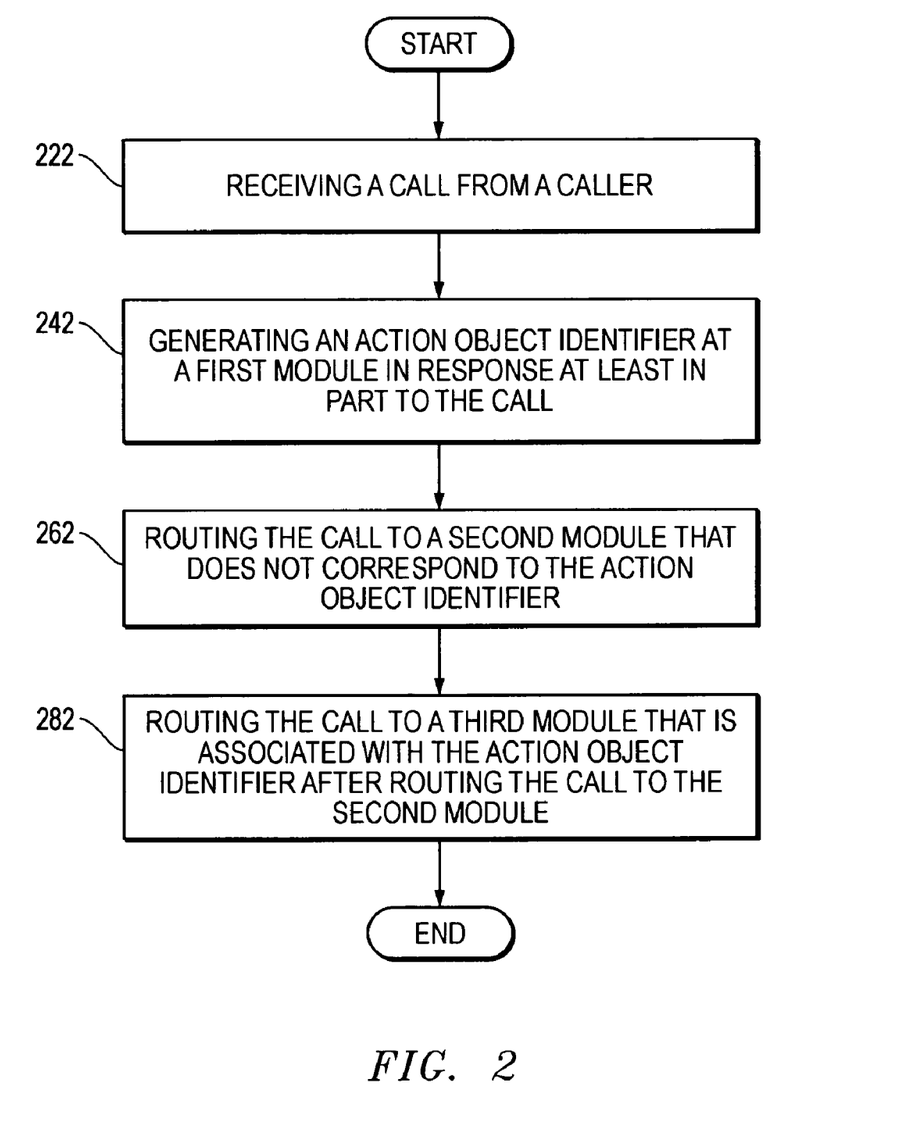
FIG. 2 includes a flow diagram of a method of using a call routing system.
Figure 3:
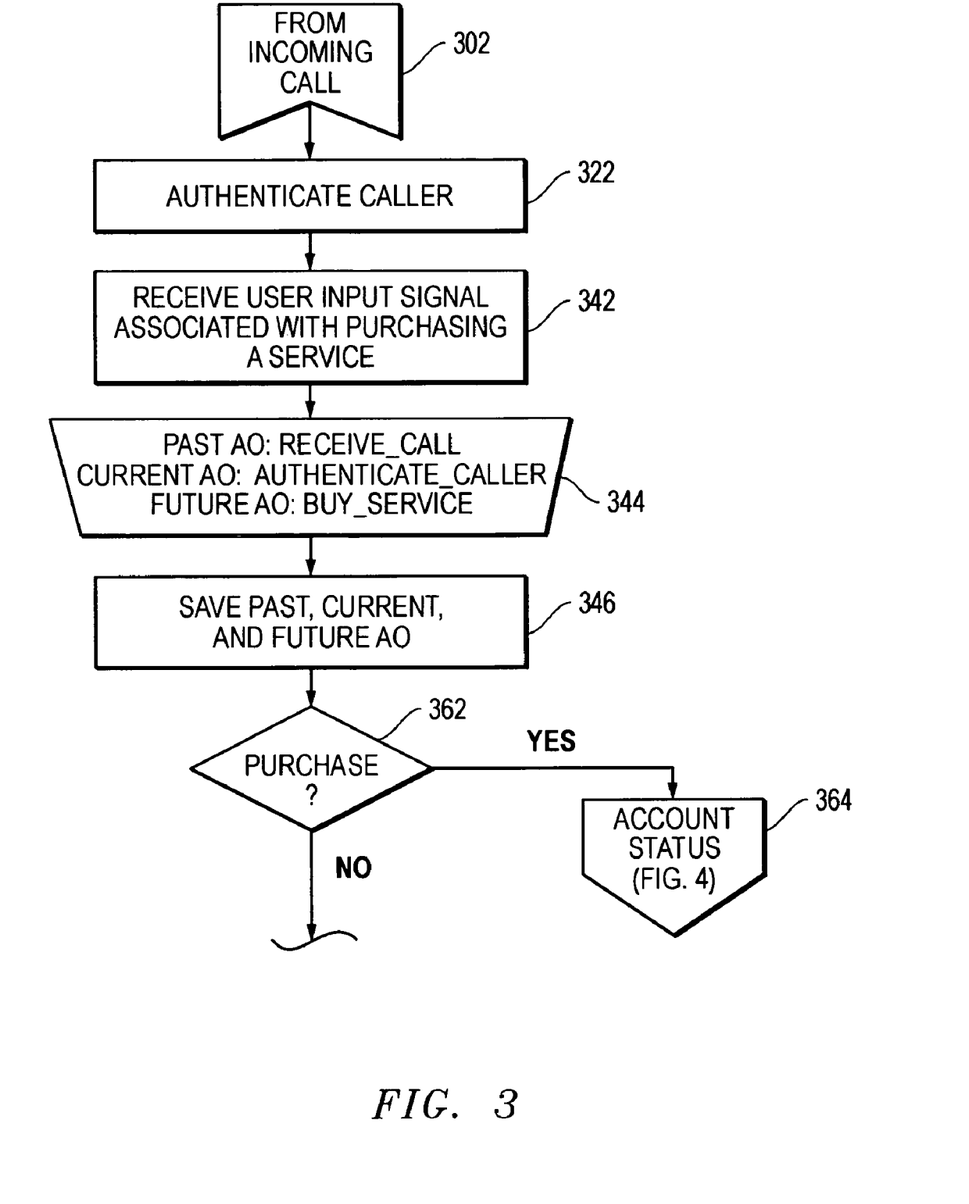
FIG. 3 includes a flow diagram of a method of authenticating a caller using the call service center of FIG. 1.
Figure 4:
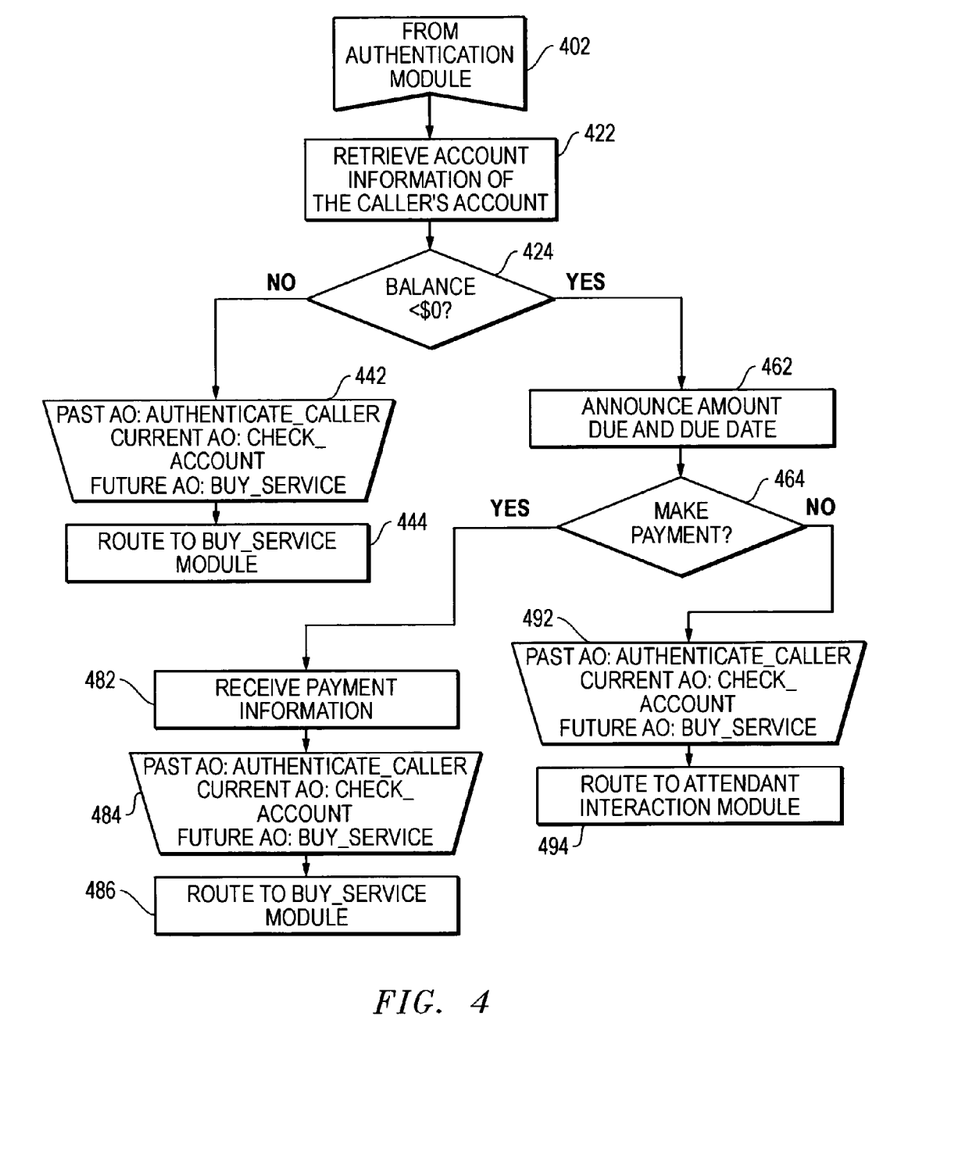
FIG. 4 includes a flow diagram of a method of inquiring an account balance associated with the caller using the call service center of FIG. 1.

Attention is now directed toward a method of using a call routing system for the call service center 100 in accordance with an embodiment, as illustrated in FIG. 2. The method can include receiving a call from the caller 164, at block 222. The method can also include generating an action object identifier at a first module in response at least in part to the call, at block 242. The method can further include routing the call to a second module that does not correspond to the action object identifier, at block 262. The method can still further include the call to a third module that is associated with the action object identifier after routing the call to the second module, at block 282. Some details regarding the operations performed as described in blocks 242, 262, and 282 are described with respect to exemplary, non-limiting embodiments, as illustrated in FIGS. 3 and 4. Occasional references will be made to the call service center 100 or one or more portions thereof, as illustrated in FIG. 1, when describing methods as illustrated in FIGS. 3 and 4.

FIGS. 3 and 4 include process flow diagrams that illustrate potential actions that may occur within an authentication module and an account status module. Referring to FIG. 3, signals can be received from an incoming call coming from the caller 164 at phone 162, at item 302. In one embodiment, the call includes a communication in which a caller's voice can be transmitted from the phone 162 to the data processing system 120. The caller 164 may or may not speak during the call. The call from the phone 162 can be received at I/O port 1202 of the data processing system 120 via the antenna 110. The signal can be transmitted from the I/O port 1202 to the controller 1220. The controller 1220 may transmit the signals to an authentication module that may be module 1231 in FIG. 1. The authentication module can be used authenticate the caller 164. The transmission from the controller 1220 may be directly from the controller 1220 to the module 1231 or may occur via the routing module 1280.

The method can include authenticating the caller, at block 322 in FIG. 3. In one embodiment, one or more conventional techniques may be used for authenticating the caller. Referring to FIG. 1, module 1231 may be used to perform the task of authentication. After authentication, the data processing system 120 may transmit one or more options to the caller 164 at phone 162 regarding one or more other actions from which the caller 164 can select. The actions can include obtaining information, such as account information, order status information, product or service information, ordering a product or service, paying a bill, transferring funds, other suitable information or transaction, or any combination thereof.

The method can also include receiving a user input signal associated with purchasing a service, at block 342. In another embodiment, the user input signal could be associated with purchasing a product or any combination of one or more products or one or more services. Referring to FIG. 1, the caller 164 at phone 162 can activate one or more keys, buttons, or other controls, or any combination thereof of the phone 162 to generate the user input signal that is received by the data processing system 120. In this particular embodiment, the caller 164 has selected to purchase a service.

Module 1231 may generate one or more action object identifiers associated with the call. In one embodiment, past, current, and future action object identifiers are generated. An action object identifier can be associated with a task that has been, is being, or is desired or otherwise intended to be performed. In a particular embodiment, a past action object identifier can be associated with a task that has been performed, a current action object identifier can be associated with a task that is being performed, and a future action object identifier can be associated with a task that is desired or otherwise intended to be performed. The past, current, and future action object identifiers may be identified with respect to a particular module. For example, the same action object identifier may have been a past action object identifier at the particular module and may be a current action object identifier at another module that immediately preceded the particular module. The level of detail regarding the action object identifiers can be varied. For example, each of the past, current, and future action object identifiers may include a reference to a module (e.g., module 1231 to 1234) or to a more particular aspect or a portion of a task that was, is, or is desired or otherwise intended to be performed at the module.

In FIG. 3, exemplary action object identifiers include "Past AO: Receive_Call," "Current AO: Authenticate_Caller," "Future AO: Buy_Service," at block 344. The information within block 344 indicates that, at module 1231, an incoming call was received before reaching module 1231, authentication is the task performed by module 1231, and the caller 164 desires to purchase a service. Other information (not illustrated) may be generated, such as whether the current action object was successfully completed, a reason why the current action object was or was not successful, other suitable information regarding the processing of the call, or any combination thereof. The method can include saving the past action object identifier, current action object identifier, future action object identifier, and potentially other information. Such information may be stored within memory (not illustrated) within the data processing system 120, or a database or other storage (not illustrated) coupled to the data processing system 120.

The method can further include determining whether the caller 164 intends to purchase a product, a service, or any combination thereof, at decision act 362. The data processing system 120 can analyze the future action object identifier to determine that the caller 164 desires to purchase a service ("yes" branch from decision act 362). The call and any one or more of the past action object identifier, current action object identifier, future action object identifier, other information, or any combination thereof may be passed to an account status module. In one embodiment, the account status module is module 1322 in FIG. 1. In a particular embodiment, the module 1321 may route the call and associated information to module 1322 or may have the routing module 1280 route the call and associated information to module 1322. Thus, the module 1321 can pass or can have passed the call and the associated information. If the caller 164 at phone 162 does not desire to purchase any products or services ("no" branch from decision act 362), the caller 164 at phone 162 may be routed to another module or allow other action to be taken by the data processing system 120 with or without further input from the phone 162. The determination whether the caller 164 intends to purchase a product, a service, or any combination thereof, at decision act 362, may be performed by the module 1321 or the routing module 1280.

The process at the account status module is illustrated in the process flow diagram in FIG. 4. The call and associated information can be passed to the account status module. In one embodiment, the account status module can be used by the entity that controls and operates the caller service center 100 to reduce the likelihood that the its customers will be allowed to make any purchases if they already are overdue in paying an outstanding balance, are at or have exceeded a credit limit of the caller's account, other one or more indicia that collecting money from the caller for an additional purchase would be difficult, or any combination thereof.

The call and associated information can be passed to the account status module from the authentication module, at item 402 in FIG. 4. The method can include retrieving account information of the caller's account, at block 422. The information may be obtained from memory (not illustrated) within the data processing system 100, or from a database, a storage network, or other external storage network (not illustrated). The method can further determine if the balance of the caller's account is less than zero, at decision act 424.

If the balance is not less than zero ("no" branch from decision act 424), the account status module can generate the past action object identifier, current action object identifier, future action object identifier, other information, or any combination thereof, at block 442. In one embodiment, one or more of the action object identifiers can be changed or otherwise generated by the account status module.

In a particular embodiment, the current action object identifier from the authentication module becomes the past action object identifier within the account status module. Thus, the past action object identifier can include "Past AO: Authenticate_Caller." The current action object identifier can be associated with the account status module, which is where the call is currently being processed. The current action object identifier can include "Current AO: Check_Account." Although not illustrated, a result identifier, a reason identifier, or both can be used to indicate that the action was successfully performed and that the account has a zero or positive balance. Note that a positive balance indicator may be used even if the balance is zero. Such information may be passed with the call. Referring to FIG. 4, the positive balance indicates that the determination in decision act 424 has been performed and the call is along the "no" branch from decision act 424.

An optional determination can be made regarding the future action object identifier from the authentication module. If the current module is not associated with the future action object identifier, the future action object identifier from the authentication module may also be the future action object identifier for the account status module. If the current module is associated with the future action object identifier but the call has not yet reached a particular portion of a task associated with the future action object identifier, the future action object identifier from the authentication module may also be the future action object identifier at this point in the process. In one particular embodiment, the caller desires to purchase a service, and therefore, the future action object identifier can be "Future AO: Buy_Service."

Other information (not illustrated) may be generated, such as whether the current action object was successfully completed, a reason why the current action object was or was not successful, other suitable information regarding the processing of the call, or any combination thereof. The method can include saving the past action object identifier, current action object identifier, future action object identifier, and potentially other information. Such information may be stored within memory (not illustrated) within the data processing system 120, a database, or other storage (not illustrated) coupled to the data processing system 120.

The method can further include routing the call to the "Buy_Service" module, at block 444 in FIG. 4. The call and any one or more of the past action object identifier, current action object identifier, future action object identifier, other information, or any combination thereof may be passed to the "Buy_Service" module. In one embodiment, the "Buy_Service" module is module 1323 in FIG. 1. In a particular embodiment, the module 1322 may route the call and associated information to module 1323 or may have the routing module 1280 route the call and associated information to module 1323. Thus, the module 1322 can pass or can have passed the call and the associated information. The caller 164 at the phone 162 may be able to acquire or otherwise purchase one or more services that the caller 164 desires. At the "Buy_Service" module, the current action object identifier at the account status module becomes the past action object identifier at the "Buy_Service" module.

The future action object identifier at the account status module becomes the current action object identifier at the "Buy_Service" module, or the current action object identifier at the "Buy_Service" module may be different and potentially more specific to the portion of the task being performed at the "Buy Service" module. The future action object identifier can be assigned a zero or null value or may be assigned a different value after a further dialog with the caller 164 at the phone 162. For the example, the caller may desire to acquire a digital subscriber line ("DSL") service for Internet access, and the future action object identifier can be "Future AO: Buy_DSL."

The call can continue with the caller 164 at phone 162, the data processing system 120, or a combination thereof providing sufficient information to the caller 164 for him or her to decide whether to acquire the DSL service, provide sufficient information to the service provider to provide the service and properly bill the caller 164 for the service, perform other associated actions, or any combination thereof.

In one embodiment, the future action object identifier can be used to keep track of where the caller 164 at phone 162, the data processing system 120, or any combination thereof desires or otherwise intends to do, even though the call may need to be processed by one or more unassociated, intervening modules, or one or more unassociated, intervening portions of one or more tasks within the same module. By using the future action object identifiers, calls can be more accurately routed while still allowing optional or intervening processing of the call to occur.

Returning to decision act 424 in FIG. 4, a determination may be made that the balance of the caller's account is less than zero ("yes" branch). In one embodiment, the method can include announcing the amount due, and optionally, the due date, at block 462. In a particular embodiment, audio signals can be generated at the data processing system 120 and be transmitted to the phone 162. The phone 162 can receive the audio signals and convert them to audible signals that the caller 164 can hear. The audible signals can also prompt the caller 164 to decide whether he or she wants to make a payment. The caller 164 can activate one or more keys, buttons, or other controls, or any combination thereof of the phone 162 to generate a user input signal that is received by the data processing system 120.

After receiving the user input signal, the method can include determining whether a payment is to be made (decision act 464 in FIG. 4). In one embodiment, the user input signal may be associated with the "yes" branch from decision act 464. The method can further include receiving payment information, at block 482. The method can vary depending on how the payment will be made. A credit, bank, or smart card may be used, a bank checking or savings account may be used, money may be wire transferred, another suitable payment selection may be used, or any combination thereof. The caller 164 at phone 162 may need to take the balance to zero, become positive, reduce the current balance by a predetermining amount (e.g., $50, $100, etc.) or a predetermined fraction (e.g., reduce negative balance by 50%, 80%, etc.). The account status module can generate the past action object identifier, current action object identifier, future action object identifier, other information, or any combination thereof, at block 484. In one embodiment, one or more of the action object identifiers can be changed or otherwise generated by the account status module.

In a particular embodiment, the past action object identifier can include "Past AO: Authenticate." The "Current AO: Check_Account." If a payment was made to reduce the balance to zero or become positive, an optional result identifier, reason identifier, or both can indicated that the account status check was successfully performed and that the account has a zero or positive account balance. An optional determination can be made regarding the future action object identifier from the authentication module. If the current module is not associated with the future action object identifier, the future action object identifier from the authentication module may also be the future action object identifier for the account status module. If the current module is associated with the future action object identifier but the call has not yet reached a particular portion of a task associated with the future action object identifier, the future action object identifier from the authentication module may also be the future action object identifier at this point in the process. In one particular embodiment, the caller desires to purchase a service, and therefore, the future action object identifier can be "Future AO: Buy_Service."

Other information (not illustrated) may be generated, such as whether the current action object was successfully completed, a reason why the current action object was or was not successful, other suitable information regarding the processing of the call, or any combination thereof. The method can include saving the past action object identifier, current action object identifier, future action object identifier, and potentially other information. Such information may be stored within memory (not illustrated) within the data processing system 120, a database or other storage (not illustrated) coupled to the data processing system 120.

The method can further include routing the call to the "Buy_Service" module, at block 486 in FIG. 4. The call and any one or more of the past action object identifier, current action object identifier, future action object identifier, other information, or any combination thereof may be passed to the "Buy_Service" module. The call can be further processed as described herein.

Returning to decision act 464, if the user input signals from phone 162 are associated with not making a payment or not making a sufficient payment, the caller 164 at phone 162 may be having a problem with the call service center 100. The account status module can generate the past action object identifier, current action object identifier, future action object identifier, other information, or any combination thereof, at block 492. In one embodiment, one or more of the action object identifiers can be changed or otherwise generated by the account status module.

In a particular embodiment, the past action object identifier can include "Past AO: Authenticate." The current action object identifier may include "Current AO: Check_Account" in one particular embodiment. An optional result identifier, reason identifier, or both can indicate that the account status check was or was not successfully performed and that the account has a negative account balance. An optional determination can be made regarding the future action object identifier from the authentication module. If the current module is not associated with the future action object identifier, the future action object identifier from the authentication module may also be the future action object identifier for the account status module. If the current module is associated with the future action object identifier but the call has not yet reached a particular portion of a task associated with the future action object identifier, the future action object identifier from the authentication module may also be the future action object identifier at this point in the process. In one particular embodiment, the future action object identifier can be "Future AO: Buy_Service."

Other information (not illustrated) may be generated, such as whether the current action object was successfully completed, a reason why the current action object was or was not successful, other suitable information regarding the processing of the call, or any combination thereof. The method can include saving the past action object identifier, current action object identifier, future action object identifier, and potentially other information. Such information may be stored within memory (not illustrated) within the data processing system 120, a database or other storage (not illustrated) coupled to the data processing system 120.

The method can further include routing the call to the attendant interaction module 1240, at block 494 in FIG. 4. The call and any one or more of the past action object identifier, current action object identifier, future action object identifier, future action object identifier, other information, or any combination thereof may be passed to the attendant interaction module 1240. In a particular embodiment, the module 1322 may route the call and associated information to the attendant interaction module 1240 or may have the routing module 1280 route the call and associated information to the attendant interaction module 1240. Thus, the module 1322 can pass or can have passed the call and the associated information.

In still another embodiment, the method may be interrupted at potentially nearly any time because the caller 164 made a wrong selection, the attendant 144 may determine that the caller 164 appears to be lost, the controller 1220 may determine that the call has been in a module too long or is causing an infinite loop to be performed by a module, or for another reason. Therefore, an interrupt signal may be generated by the phone 162, the attendant terminal 142, or the data processing system 120. The interrupt signal can be used to at least temporarily stop processing in order for another action to be taken.

For example, the caller 164 may determine that he or she desires to have an attendant 144 service the call. The phone 162 can generate an interrupt signal that is received by the controller 1220 of the data processing system 120. The controller 1220 can then transmit one or more signals to any one or more modules within the data processing system 120. For example, the controller 1220 can instruct the routing module to route the call, and optionally one or more action object identifiers, a result identifier for a current or other action object, and a reason identifier for the current or other action object to the attendant interaction module 1240. The attendant interaction module 1240 can transmit a notice to the attendant terminal 142 for the attendant 144 to service the call. The attendant terminal 142 can then transmit one or more attendant input signals to the attendant interaction module 1240 that can generate an attendant interaction signal. The attendant interaction signal can be transmitted to the disposition module 1260, which in turn, can generate a disposition signal that can be transmitted to the routing module 1280.

During the process, the call and associated information can be passed from one module to another module. When the past, current, and future action object identifiers, and other associated information are passed with the call, the modules within the data processing system 120, or the attendant 144 at the attendant terminal 142 may quickly analyze status information regarding the call without having to access a log file or otherwise retrieve data from storage. By not having to analyze data within a log file or retrieving information from storage, handling of the call at the call service center 100 may be done more quickly and efficiently.

Whenever a past object identifier, a current object identifier, a future object identifier, any other associated information, or any combination thereof is generated or used to route a call, such information can be stored within a log file. The log file can be used by the attendant, analyzing call data to improve or otherwise change a configuration of the call service center, or for another reason.

In an alternative embodiment, the balance determination 424 may be replaced by or performed in conjunction with a credit limit determination. For example, the determination could include determining whether the caller's account has a zero or negative credit limit (e.g., user was previously allowed to exceed his or her credit limit). If caller's account has a positive credit limit ("no" branch from decision act 424), the method can proceed as described with respect to block 442 and block 444. If the caller's account has a zero or negative credit limit ("yes" branch from decision act 424), the method can proceed as described with respect to decision act 464 and subsequent blocks.

In still another embodiment, the credit limit of the caller's account may be determined after retrieving account information of the caller 164 at block 442. An available amount remaining regarding the credit limit may be determined and the caller 164 may be able to purchase one or more products, one or more services, or any combination thereof to the extent the credit limit is not exceeded. If the caller 164 exceeds the available amount, the data processing system 120 can allow the caller 164 to delete one or more products, one or more services, or a combination thereof until the credit limit for the caller's account is no longer exceeded, require the caller 164 to pay the difference between the value of the purchased items and the available amount, allow the caller 164 to pay for the current items being purchased, or any combination thereof.

The use of one or more action object identifiers, other information, or any combination thereof by a call routing system can allow for more accurate routing of a call within a call service center. The likelihood of inaccurate routing or unnecessary human intervention by an attendant can be significantly reduced. Retrieving a log file or information from a database is not needed in order to use the call routing system as described. Therefore, more accurate automated routing with less human intervention can be achieved with a call routing system.

The call routing system may be used in a variety of call service centers. In one non-limiting embodiment, the call service center 100 can include a speech-enabled, self-service call routing system or call service center for performing one or more transactions or obtaining information from the entity that controls the call service center 100. The methods described herein are highly flexible and can be tailored to the particular needs to desires of the entity.

Note that not all of the activities described above in the general description or the examples are required, that a portion of a specific activity may not be required, and that one or more further activities may be performed in addition to those described. Still further, the order in which activities are listed are not necessarily the order in which they are performed.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   generating a first identifier at a first module of a data processing system, wherein the first identifier is generated in response to a call received at the data processing system and wherein the first identifier identifies a first action;
   after generating the first identifier, automatically routing the received call and the first identifier to a second module of the data processing system, wherein the second module is associated with one or more actions and wherein the first action identified by the first identifier differs from each of the one or more actions associated with the second module;
   after routing the received call and the first identifier to the second module, performing one of the one or more actions at the second module; and
   after performing the one of the one or more actions at the second module, routing the received call from the second module to a third module of the data processing system, wherein the third module is associated with the first action.

2. The method of claim 1, wherein the first action comprises a purchase of at least one of a product and a service by a caller associated with the call.

3. The method of claim 2, wherein the action performed at the second module comprises determining account status information of an account of the caller associated with the call.

4. The method of claim 1, further comprising:
   receiving an interrupt signal at the second module while the one of the one or more actions is being performed at the second module;
   in response to receipt of the interrupt signal at the second module, routing the call from the second module to an attendant interaction module;
   receiving an attendant input signal from an attendant at the attendant interaction module; and
   in response to receiving the attendant input signal at the attendant interaction module, routing the call from the attendant interaction module to the third module.

5. A data processing system comprising:
   a first module, the first module configured to:
      generate a first identifier that identifies a first action, wherein the first identifier is generated in response at least in part to receipt of a call; and
      pass the call and the first identifier to a second module, wherein the second module is associated with one or more actions and wherein the first action identified by the first identifier differs from each of the one or more actions associated with the second module; and
   the second module, wherein the second module is configured to:
      perform one of the one or more actions; and pass the call, or have the call passed, to a third module, wherein the third module is configured to perform the first action.

6. The data processing system of claim 5, wherein each of the first, second, and third modules is configured to pass a second identifier associated with the call to a corresponding subsequent module.

7. The data processing system of claim 5, wherein the second module is an attendant interaction module that is configured to:
   transmit the first identifier to a first output port;
   receive an attendant input signal from an attendant at a first input port of the attendant interaction module; and
   transmit the attendant input signal to a disposition module.

8. The data processing system of claim 5, further comprising a disposition module and a routing module, wherein:
   the second module is an attendant interaction module and is further configured to transmit the first identifier to a first output port in response to an attendant input signal received at a first input port of the attendant interaction module;
   the disposition module is configured to:
     receive the call, the first identifier, and the attendant input signal from the attendant interaction module; and
     generate a disposition signal in response at least in part to the attendant input signal; and
   the routing module is configured to:
     receive the call, the first identifier, and the disposition signal from the disposition module; and
     route the call and the first identifier to the third module in response at least in part to the disposition signal.

9. A computer-readable medium storing processor-executable instructions that, when executed by a processor, cause the processor to:
   generate a first identifier at a first module in response to information gathered from a call that has been received, wherein the first identifier identifies a first action;
   route the call and the first identifier to a second module, wherein the second module is associated with one or more actions and wherein the first action differs from each of the one or more actions associated with the second module; and
   route the call to a third module that is associated with the first action after routing the call to the second module.

10. The computer-readable medium of claim 9, wherein the first identifier is associated with a future task pertaining to the call.

11. The computer-readable medium of claim 9, wherein the instruction to route the call to the third module comprises an instruction to pass the first identifier from the second module to the third module.

12. The computer-readable medium of claim 9, wherein:
   one of the one or more actions includes determining an account status; and
   the first action includes purchasing at least one of a product and a service.

13. The computer-readable medium of claim 9, wherein a first instruction to route the call to the third module is executed by the processor in response at least in part to the first identifier routed to the second module.

14. The computer-readable medium of claim 9, wherein the processor-executable instructions comprise an instruction to route the call from the second module to an attendant interaction module in response at least in part to receiving an interrupt signal when the call is being processed by the second module, wherein the instruction to route the call to the third module is executed in response at least in part to receiving an attendant input signal at the attendant interaction module.

15. A computer-readable medium having data to be used with a call routing system, wherein the data is embodied within the computer readable medium, the data storing a processor-executable instruction that, when executed by a processor, causes the processor to:
   pass a call, a first identifier that is associated with a first action, and a second identifier from a first module to a second module, wherein the first and second modules are within the call routing system, wherein the first identifier and the second identifier are associated with the call and are generated in response to information received via the call, wherein the second module is associated with one or more actions, and wherein the first action differs from each of the one or more actions.

16. The computer-readable medium of claim 15, wherein each of the first identifier and second identifier comprises one of a past identifier, a current identifier, and a future identifier.

17. The computer-readable medium of claim 15, wherein the processor-executable instruction further causes the processor to pass a third identifier from the first module to the second module, wherein:
   the first identifier comprises a future identifier that is associated with a first task to be completed at a future time;
   the second identifier comprises a current identifier that is associated with a second task to be completed at a present time; and
   the third identifier comprises a past identifier that is associated with a third task that was completed at a prior time.

18. The computer-readable medium of claim 17, wherein the second task comprises one of authenticate caller and check account.

19. The computer-readable medium of claim 9, wherein a plurality of distinct identifiers are generated that are simultaneously associated with the call and include:
   a past identifier associated with a past task that has been performed;
   a current identifier associated with a current task that is currently being performed; and
   a future identifier associated with a future task that is to be performed at a future time.

20. The computer-readable medium of claim 17, wherein the future identifier indicates that a caller originating the call desires to purchase a service, a product, or a combination thereof.

21. The computer-readable medium of claim 17, wherein the second task comprises authenticate caller and the third task comprises receive the call.

22. The computer-readable medium of claim 17, wherein the second task comprises check account and the third task comprises authenticate caller.

23. The computer-readable medium of claim 22, wherein the processor-executable instruction further causes the processor to pass a result identifier indicating that an account associated with a caller that initiated the call has a zero or positive balance.

24. The computer-readable medium of claim 22, wherein the processor-executable instruction further causes the processor to pass information including a reason associated with one of success and failure of the second task.

25. The method of claim 1, wherein the first identifier is generated at the first module in response to information gathered via the call that is received.

26. The method of claim 1, wherein a caller associated with the call does not speak during the call.

27. The method of claim 1, further comprising generating:
a second identifier associated with a second action that is being performed at the second module; and
a third identifier associated with a past action that has been performed at the data processing system.

28. The method of claim 27, further comprising storing the first identifier, the second identifier, and the third identifier at a memory that is coupled to the data processing system.

29. The data processing system of claim 5, wherein the first identifier is generated in response to information gathered via the call that is received.

30. The method of claim 1, wherein the data processing system includes a controller, the controller configured to route the received call from the first module to the second module.

31. The data processing system of claim 5, further comprising an input/output port operative to receive the call.

* * * * *